A. BIE.
CYLINDER COVER FOR COMBUSTION ENGINES.
APPLICATION FILED APR. 6, 1915.
1,260,860.
Patented Mar. 26, 1918.
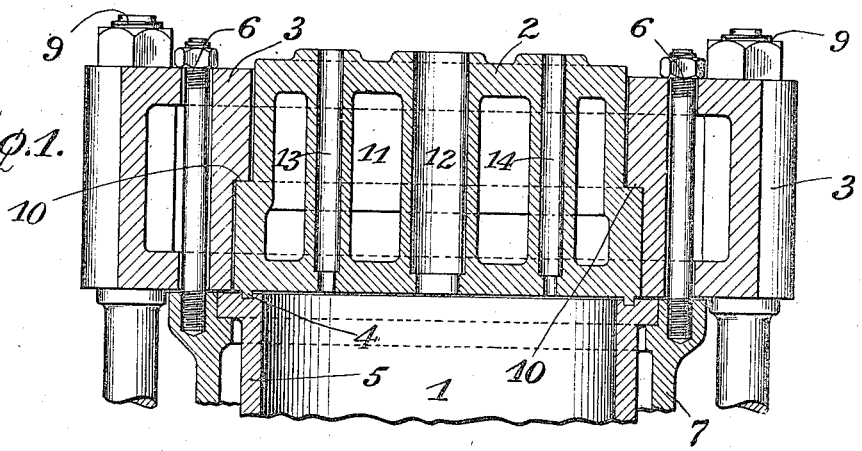
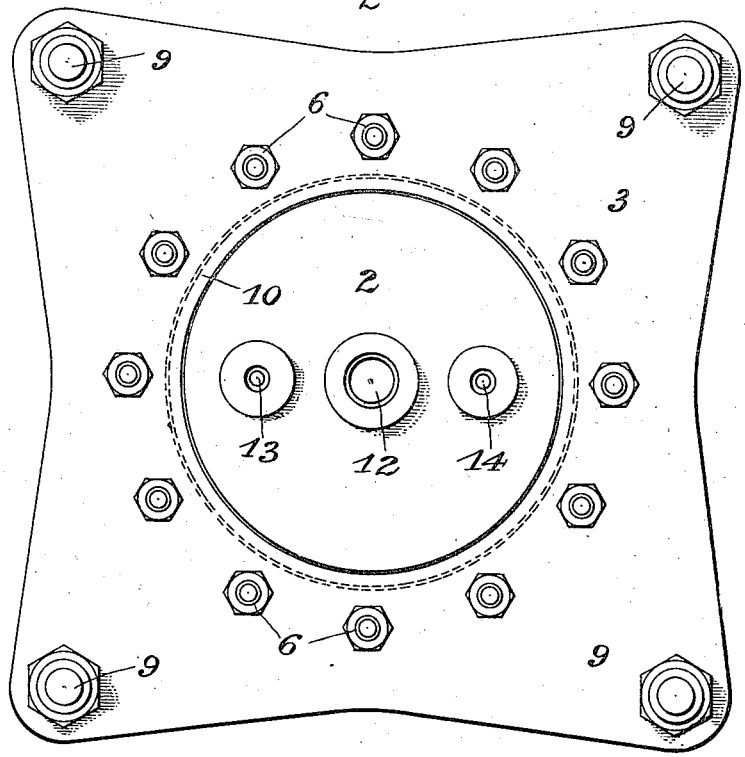
Witnesses:
W. H. Hawkins
H. L. Grant
Inventor
Albert Bie
By Attorney

UNITED STATES PATENT OFFICE.

ALBERT BIE, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

CYLINDER-COVER FOR COMBUSTION-ENGINES.

1,260,860.     Specification of Letters Patent.     Patented Mar. 26, 1918.

Application filed April 6, 1915. Serial No. 19,551.

*To all whom it may concern:*

Be it known that I, ALBERT BIE, a subject of the King of Norway, residing at Winterthur, Canton of Zurich, Switzerland, have invented certain new and useful Improvements in Cylinder-Covers for Combustion-Engines, of which the following is a full, true, and complete specification.

This invention is an improvement in internal combustion engine cylinder construction, and consists more especially in a sectional cylinder head or cover possessing certain advantages, among them freedom for radial thermal expansion and reduction of strains due to outward pressure in the combustion chamber.

In the accompanying drawings illustrating so much of an internal combustion engine as is necessary for an understanding of the invention:

Figure 1 is an axial section through the head and the adjacent portion of the cylinder proper; and Fig. 2 is a plan view of the head.

The cylinder body is shown as composed of the inner wall 5, in which the piston is guided, and an outer or jacket shell 7, which may be separate as shown, or in one piece, and between which a water-circulating space is formed as usual.

The cylinder head comprises a central circular body 2, which closes the end of the combustion chamber 1, and an outer part 3, which presses the central body against the end of the cylinder, where provision is made, as indicated at 4, for effecting a tight joint in a usual or suitable manner. The central body is hollow, containing the water cooling space 11, and has openings 12, 13, 14 for reception of suitable valves, not shown, such as the fuel injection, combustion air, and starting air valves of a Diesel engine. Bearing is afforded between the central and outer parts of the head of such nature as to effect tight closing of the cylinder while at the same time permitting free radial expansion of the central body as the latter is heated from the combustion space. In the particular construction shown the central body is provided with a peripheral shoulder 10 intermediate its inner and outer faces, and the outer part 3 has a coöperative shoulder to bear thereagainst, space for expansion being left between the cylindrical surfaces as shown in Fig. 1. This construction also minimizes the strain due to outward pressure on the cylinder head, and in this connection the joint 4 and the shoulder bearing 10 are preferably made of approximately the same diameter.

The outer part 3 of the cover is pressed toward the cylinder end, so as to hold the part 2 against the same, by means of bolts 9, which pass to the base of the engine. The outer part is also penetrated by bolts 6 which enter the cylinder jacket wall 7, and manifestly the bolts 9 might be dispensed with and the bolts 6 alone relied upon to resist the pressure in the cylinder.

What is claimed as new is:

1. The combination with a water-jacketed internal combustion engine cylinder, of a cylinder head separate from the cylinder and comprising a central circular body bearing against the end of the cylinder to close the end of the combustion space, and an outer encircling part holding said central body against the end of the cylinder.

2. The combination with a water-jacketed internal combustion engine cylinder, of a cylinder head separate from the cylinder and comprising a central circular body bearing against the end of the cylinder to close the end of the combustion space, an outer encircling part having a shoulder bearing against the peripheral portion of the central body, and fastening means engaging said outer part and holding the same against the central body and the latter in turn against the end of the cylinder.

3. The combination with a water-jacketed internal combustion engine cylinder, of a cylinder head separate from the cylinder and comprising a central circular body bearing against the end of the cylinder to close the end of the combustion space and having a peripheral shoulder intermediate its inner and outer faces, and an outer encircling part having a coöperative shoulder, and bolts engaging said outer part to press the central body against the cylinder end.

4. In an internal combustion engine, the combination with a water-jacketed cylinder, of a head separate from the cylinder and comprising a central body forming a joint with the end of the cylinder and closing the end of the combustion space, and an outer encircling part having a bearing against the peripheral portion of the central body, said bearing and joint being of approximately the same diameter, and means acting upon said outer part to hold the central body to a tight joint with the cylinder.

5. In an internal combustion engine having a water-jacketed cylinder, a cylinder head separate from the cylinder and comprising a central circular body bearing against the end of the cylinder to close the end of the combustion space, and an outer encircling part having a bearing against the peripheral portion of the central body to hold the same to the cylinder, said central body being free for radial expansion relative to the outer part.

6. In an internal combustion engine having a water-jacketed cylinder, a cylinder head separate from the cylinder and comprising a central circular hollow body containing a water cooling space and having valve openings formed therethrough, an outer encircling part bearing against the peripheral portion of the central body, and bolts engaging the said outer part to draw the central body against the cylinder.

In testimony whereof I have signed this specification in the presence of two witnesses.

ALBERT BIE.

Witnesses:
ARLON T. ADAMS,
CARL GUBLER.